United States Patent [19]
Stinson

[11] 3,743,220
[45] July 3, 1973

[54] LEADING EDGE FLAP MECHANISM
[75] Inventor: William E. Stinson, Mercer Island, Wash.
[73] Assignee: Stinson Aircraft, Inc., Renton, Wash.
[22] Filed: Oct. 26, 1971
[21] Appl. No.: 192,466

[52] U.S. Cl............................. 244/42 CA, 244/44
[51] Int. Cl............................................ B64c 21/08
[58] Field of Search .................... 244/42 R, 42 CA, 244/42 D, 42 CB, 40, 44

[56] References Cited
UNITED STATES PATENTS
3,504,870  4/1970  Cole et al.......................... 244/42 R
2,650,047  8/1953  Carhart et al........................ 244/44

Primary Examiner—Milton Buchler
Assistant Examiner—Carl A. Rutledge

[57] ABSTRACT

An aircraft airfoil leading edge flap mechanism utilizing a pivotally mounted forming rib in combination with a portion of the airfoil skin having resilient characteristics. Extension of the rib by rotation about its pivotal mounting means deforms the resilient skin portion over the forming rib into a desired highly cambered, high lift, low speed airfoil curvature having increased area, camber and chord for landings and take-offs. An always smooth and uninterrupted airfoil nose section surface will be maintained at the retracted position during the extending or retracting movement and at the extended leading edge position.

7 Claims, 2 Drawing Figures

Patented July 3, 1973

3,743,220

LEADING EDGE FLAP MECHANISM

BACKGROUND OF THE INVENTION

1. Field of the Invention

This invention relates to a leading edge flap mechanism in airfoils and in particular to a leading edge flap utilizing a flexible skin for forming the desired camber curvature.

2. Description of the Prior Art

There have been many attempts to change the contour of wings to provide high lift, low drag, low speed airfoil shape for landings and take-offs and yet be changeable back into a high speed, contoured wing. Other devices which solve this problem in varying degrees are: Gilmore U.S. Pat. No. 1,631,259, June 7, 1927; Quenzler U.S. Pat. No. 3,089,666, May 14, 1963; Calderon U.S. Pat. No. 3,128,966, Apr. 14, 1964; Calderon U.S. Pat. No. 3,195,836, July 20, 1965; Riedler U.S. Pat. No. 3.208,693, Sept. 28, 1965, and Cole et al U.S. Pat. No. 3,504,870. Apr. 7, 1970.

None of these patents show the disclosed invention of a leading edge flap that comprises a forming rib and an unattached flexible skin portion in a combined cooperating, structual arrangement and relationship during extension of the flap only.

SUMMARY OF THE INVENTION

Thus, a leading edge flap mechansim is disclosed herein comprising a flexible skin, which when retracted forms the nose and forward bottom surface of an airfoil, and a forming rib that is contoured to a desired aerodynamic curvature for forming or shaping the flexible skin into a flap that in combination with the airfoil provides the required camber and chord configuration for high lift at low speeds.

A mechanism is employed which upon actuation moves the forming rib against the flexible skin portion and constrains the skin about the curvature of the forming rib while simultaneously moving rotationally downward and forward into the extended leading edge position.

The actuation of the mechanism is caused by rotationally driving means. The mechanism for extending and retracting the forming rib utilizes a pair of linkages pivotally connected on a bellcrank which upon rotation places the linkages in an over-center locking position so that the flap upon extension is in a locked position and upon reverse rotation of the bellcrank the over-center locked relationship becomes released and the forming rib retracted within the airfoil while the flexible skin is returned to its previous condition of forming part of the high-speed airfoil.

In general, the present invention relates to an aircraft airfoil leading edge flap mechanism comprising: a nose skin section of resilient material forming part of the airfoil; a forming rib means pivotally mounted about a pivot means located within the airfoil adjacent its leading edge, and an actuating means connected to the forming rib means for extending the forming rib means through rotation about the pivot means in a downward forward direction, and vice versa, whereby the forming rib means upon extending deforms the skin section into a desired aerodynamic curvature for forming a highly cambered, high lift, low-speed airfoil.

In addition, it can be stated that the main aerodynamic features are:

1. Ability of the mechanism to achieve a well rounded leading edge or bulbous leading edge which has the effect of increasing wing camber and maintaining lift at a higher angle of attack.
2. The device has, in comparison to a slotted L.E. flap, less drag for a given amount of lift.
3. The device allows the additional feature of tailoring parts of the wing (by segmentation) to more or less degree than other parts, and still retracting to a high speed configuration.
4. The device provides at all times during extension or retraction a smooth uninterrupted outer surface along the airfoil complete nose section, upper and lower leading edge.

Accordingly, it is one of the most important objects to provide for a leading edge mechanism which in the retracted state, during extending or retracting movement and at the extended state or position, offers an always smooth curvature without interruptions over the airfoil nose leading edge area.

Also, a principal object of this invention is to provide a new method for providing the highest aerodynamic performance when converting a high cruise speed wing to a low speed wing for landings and take-offs.

Another principal object of this invention is to provide a flexible leading edge flap for converting a high speed airfoil to a low speed, high lift, low drag airfoil.

A further object of this invention is to provide a flexible leading edge wing that is flexed from a retracted position against the wing leading edge nose and lower surface to the desired or predetermined aerodynamically curved shape in a position extended from the wing leading edge.

A still further object of this invention is to provide for a leading edge flap mechanism utilizing a forming rib means which upon rotation for flap extension, by an actuating means carrying a pair of linkage means, and which actuating means when driven by an associated drive means deforms a flexible skin portion of said airfoil into a desired flap extended high camber, high lift curvature airfoil combination.

Another object of this invention is to provide a leading edge flap having an aerodynamically shaped flap nose unfoldable therefrom to give a wing capabilities of easy conversion from a high speed wing for cruising flight to a very high lift, low drag, low speed wing for landings and take-offs.

Other objects and various advantages of the disclosed Aircraft Leading Edge Flap Mechanism will be apparent from the following detailed description, together with the accompanying drawings, submitted for purposes of illustration only and not intended to define the scope of the invention, reference being made for that purpose to the subjoined claims.

BRIEF DESCRIPTION OF DRAWINGS

The drawings diagrammatically illustrate by way of example, not by way of limitation, one form of the invention wherein like reference numerals designate corresponding parts in the several views in which.

DESCRIPTION OF THE PREFERRED EMBODIMENTS

The invention, the scope of which is defined in the appended claims, is not limited in its application to the details of construction and arrangement of parts shown and described, since the invention is capable of other embodiments and of being practiced or carried out in various other ways. Also, it is to be understood that the phraseology or terminology employed herein is for the purpose of description and not limitation.

The invention comprises a new method for increasing the lift of an airfoil, such as an aircraft wing, by (1) flexing the portion of the nose and bottom skin into the desired aerodynamical shape by a forming rib in the extended position, and by decreasing the lift by (2) flexing the skin to the shape forming partly the nose and under surface of the wing when in retracted or normal airfoil position.

In order to fully disclose this invention so as to enable a person skilled in the art to carry out the same, it is deemed necessary to define the flexible skin material as a non-metallic material such as a glass fiber resin or a metallic one such as aluminum or the like, or a combination of metal and fiber. A flexible material or a spring-type resilient material or a memory retention type of material can be utilized, and many existing well known materials will be sufficient for obtaining the desired result.

Figure 1:
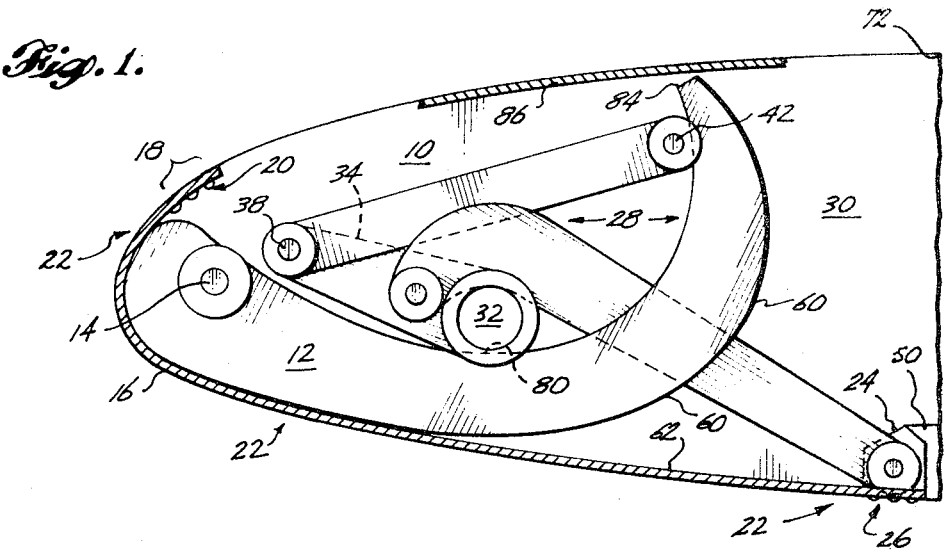
FIG. 1 is a schematic sectional view of the nose portion of a typical aircraft airfoil with its leading edge flap mechanism in retracted position.
Figure 2:
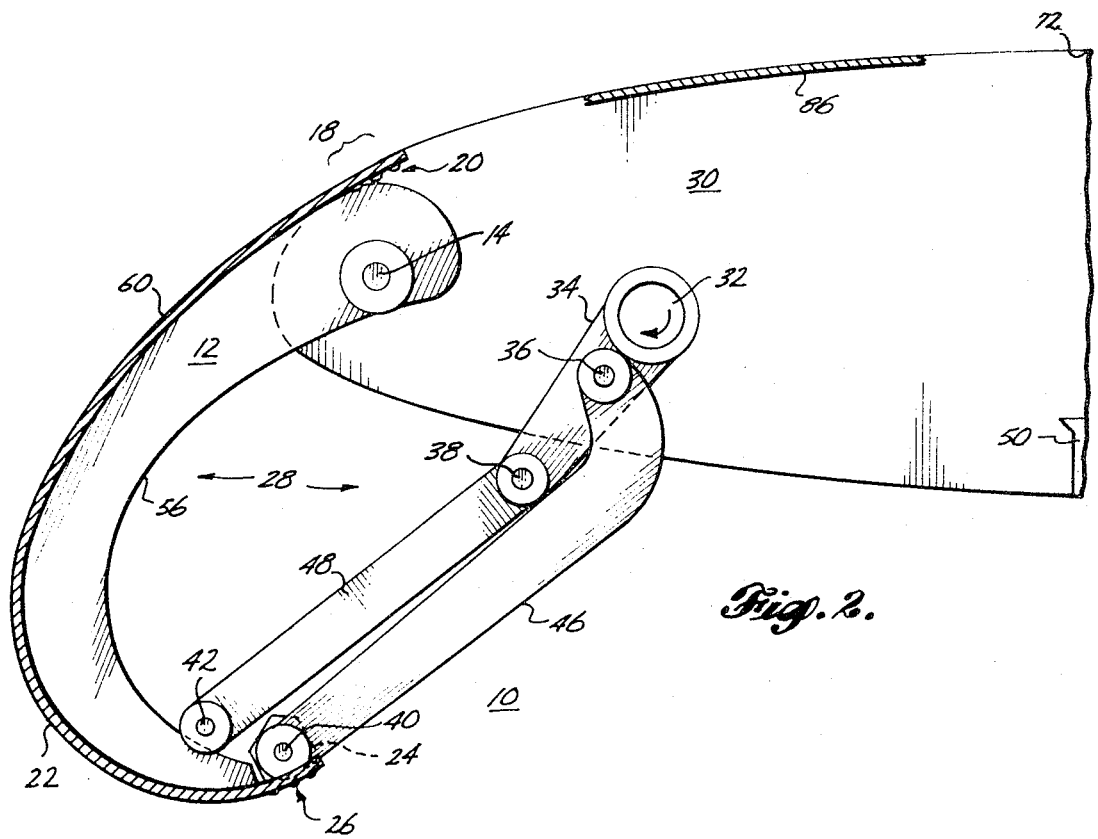
FIG. 2 is a schematic sectional view of the same nose position illustrated in FIG. 1 with its leading edge flap mechanism in extended position.

Now, referring to FIGS. 1 and 2, there is illustrated a leading edge flap mechanism 10 which utilizes a forming rib 12 mounted about a pivot means 14 located forward and adjacent of the airfoil leading edge.

A skin portion 16 made from a memory retention material or a flexible material as described is fixedly mounted along a spanwise airfoil portion 18 by fastener means 20 or the like.

From the fixedly mounted portion 18 the skin section 22 is unengaged and disposes itself in a shape coincident with and part of the airfoil cross-sectional periphery. At the end of the unengaged skin section 22 is a bracket 24 mounted to the skin 16 by fastener means 26 or the like.

In the retracted condition, FIG. 1, the flap mechanism 10, which comprises an actuating means 28, is stored within the nose wing interior 30.

The actuating means 28 is unfolded by the power of an associated drive means (not shown) that rotates the axle 32 in the direction of the arrow and moves the following described components which are all part of the actuating means or mechanism 28. Thus, the mechanism 28 comprises the axle 32, which is integrally connected to a bellcrank 34. The bellcrank 34 contains two spaced-apart pivot points, a first pivot point 36 and a second pivot point 38. The rib bracket 24 retains a third pivot point 40, and the forming rib 12 employs a fourth pivot point 42.

A first linkage 46 interconnects the first pivot point 36 and the third pivot point 40 and a second linkage 48 interconnects the second pivot point 40 and fourth pivot point 42. Upon rotational actuation of the axle 32 in the direction of the arrow, the bellcrank 34 will move the first linkage 46 which will move the skin section downwards from the airfoil interior 30 and away or unlock from a stop or installed snap-in means 50, located on the under-surface interior portion of the airfoil. Simultaneously the second linkage 48 will swing the forming rib means 12 with its convex surface 60 against the interior surface 62 of the skin section 22 and pull that skin section 22 about the surface 60 in tight contact relationship so that a smooth flowing curvature 70 exists from point 72 to bracket 24, as shown in FIG. 2. The linkage 46 will stop further rotation as soon as full extension is achieved, and, accordingly, the over-center position of the linkages by means of the position of pivot point 38 with respect to 42 and 40 will keep the leading edge flap thus formed by the contacting engagement of rib 12 with skin section 22 in a locked extended position.

At the folded or retracted stage, the rib 12 may stop against the axle 32 at the concave surface portion 80, or at the rib 12 end portion 84 against the inside upper nose area 86.

Of course, it should be understood that those stop and/or snap-in retainer means such as stop 50 are optional and that various other configurations can be designed for obtaining the same results. Furthermore, it should also be understood that the drive means (not shown) which rotates axle 32 may be removed and instead of driving axle 32 one may drive or rotate the pivot means 14 and achieve similar results. It can therefore be seen that various mechanisms or means for carrying out the unfolding and retracting of the rib 12 and skin 22 may be devised which are all obvious to a person skilled in this art.

While one desirable embodiment of the invention has herein been disclosed by way of example, it is to be understood that the invention is not necessarily limited to this precise embodiment but is to be regarded as broadly inclusive of any and all equivalent constructions falling within the scope of the appended claims.

Now, therefore, I claim:

1. An airfoil leading edge flap mechanism comprising;
    a. a nose skin section of resilient material forming part of said airfoil; said section extending for a substantial predetermined portion from said airfoil nose area to said airfoil leading edge lower surface and being fixedly mounted to said airfoil nose area in a spanwise direction while being unengaged from said fixedly mounted area to said skin opposite end at said airfoil leading edge lower surface,
    b. a forming rib means pivotally mounted within said airfoil nose section adjacent said airfoil leading edge,
    c. actuating means arranged within said airfoil nose for pivoting said forming rib means in a downward forward direction and vice versa, for extension and retraction respectively;
    d. said actuating means including a first linkage means mounted pivotally to said opposite skin end for keeping said skin section in controlled curvature during said extension and retraction;
    e. said actuating means including a second linkage means for moving said rib means in downward forward direction about said rib means pivotal mounting, whereby said forming rib means upon extending rotation from said airfoil nose section deforms said section into a desired aerodynamic curvature for a highly cambered, high lift, low speed, airfoil, and
    f. said actuating means including a pivotal mounted bellcrank means having a pair of spaced-apart located pivot points carrying said first and said second linkage means so that upon rotation of said bellcrank by an associated drive means said forming rib means and said skin section are positioned in coordination with one another in predetermined required positions for said flap extension and retraction and whereby said pair of spaced locations are positioned to cause an over-center position of said linkage spaced pivotal points in said full extension so that outside forces against said extended leading edge mechanism meet a locked structural extended position of said leading edge flap mechanism.

2. An aircraft leading edge flap mechanism for airfoils comprising;
  a. an actuating mechanism driven by an associated driving means; said actuating mechanism including; a bellcrank connected for rotation to said associated driving means; a forming rib means, a first and a second linkage each pivotally carried by said bellcrank;
  b. said forming rib means pivotally mounted within said airfoil for downward forward rotation about said pivotal mounting and vice versa;
  c. a flexible skin section, covering at least partly said airfoil nose area and said airfoil leading edge under-surface, fixedly mounted at said airfoil nose area and supportedly and pivotally mounted to said first linkage at said skin section opposite end from said fixedly mounted nose area, and d. said second linkage means pivotally mounted with said forming rib means so that upon actuation of said driving means said bellcrank actuates said first and second linkages for moving said skin section and said rib means respectively in said downward and forward position for forming said leading edge curvature, whereby said forming rib means contacts said flexible skin section and deforms said section so that an airfoil extending leading edge curvature of increased and desired high lift camber is achieved.

3. An aircraft leading edge flap mechanism for airfoils as claimed in claim 2 wherein said first and second linkages are positioned in over-center locking arrangement so that said first linkage pulls said flexible skin section in tight arrangement about said forming rib means.

4. An aircraft leading edge flap mechanism for airfoils as claimed in claim 3 wherein said first linkage means is adapted, upon reverse actuation of said driving means, to retract said flexible skin section by said opposite end pivotally and supportedly arranged mounting means, so that said skin curvature becomes coincident with said basic airfoil periphery supported by said first linkage mounting.

5. An aircraft wing improved airfoil leading edge flap mechanism maintaining absolutely smooth nose leading edge surface curvature during and at extended and retracted positions comprising
  a. actuator means driven by associated controlled driving means;
  b. said actuator means including:
    a bellcrank rotationally mounted within said airfoil nose section for receiving said driving means force for rotation;
    a first and a second elongated linkage means mounted each at one end and in spaced relationship with one another on said bellcrank;
    a forming rib, having a desired low speed high camber curvature, pivotally mounted within said nose section next to said airfoil nose leading edge for pivoting downward and forward from and out of said nose section for extension of said leading edge flap and vice versa for retraction of said leading edge flap and said forming rib pivotally connected to said first linkage other end for positioning said forming rib in said extension and retraction;
  c. a skin section of flexible material fixedly mounted to said aircraft wing along a spanwise location on said airfoil upper nose leading edge and disposed freely and coincidentally with said aircraft wing airfoil contour from said fixedly mounted location until a predetermined area approximately at said airfoil leading edge lower surface end area and pivotally supported at said end area onto said second linkage means other end, and
  d. said first and said second elongated linkage means proportioned at predetermined lengths so that upon rotation of said actuator means due to controlled driving input by said driving means, said first linkage pushes said forming rib curvature against said flexible skin section during extension and thereby said flexible skin is pulled about said curvature and is kept smooth and in tight condition by said second linkage holding said skin at said skin end area and whereby during retraction said second linkage means positions said skin in its previous position coincident with said aircraft wing airfoil contour.

6. An aircraft wing improved airfoil leading edge flap mechanism as claimed in claim 5 wherein said aircraft wing at said predetermined area approximately at said airfoil leading edge lower surface end area is provided with a mounted on stop holding means for assuring a correctly positioned leading edge at retraction.

7. An aircraft wing improved airfoil leading edge flap mechanism as claimed in claim 6 wherein said first and said second linkage means pivotal mountings on said bellcrank in relationship with said mountings on said forming rib and said flexible skin end area provide for an over-center locking arrangement at said extended position of said leading edge.

* * * * *